United States Patent Office 3,598,756
Patented Aug. 10, 1971

3,598,756
PHOSPHATE- AND CHROMATE-FREE
CORROSION INHIBITOR
Allyn H. Heit, Mount Holly, N.J., assignor to
Sybron Corporation, Rochester, N.Y.
No Drawing. Filed Sept. 4, 1968, Ser. No. 757,454
Int. Cl. C23f 11/16
U.S. Cl. 252—389          12 Claims

ABSTRACT OF THE DISCLOSURE

Lignosulfonate base, chromate- and phosphate-free corrosion inhibitor for the treatment of water. The inhibitor consists of 50%–90% of a lignosulfonate product, 5%–20% of water soluble, polyvalent metal salt, and .5%–10% of mercaptobenzothiozote, dibutylthiourea or mixtures of the two. The preferred metal salt is zinc sulfate monohydrate.

BACKGROUND OF THE INVENTION

This invention relates to a composition for inhibiting the corrosive effects of water on metal and more particularly, this invention relates to a phosphate and chromate free corrosion inhibitor and a process for inhibiting the corrosive effects of water on metal.

Cooling water corrosion inhibitors normally used to inhibit corrosion in aqueous cooling and heating systems and the like have largely contained chromates and/or polyphosphates as the main active ingredient for the prevention of corrosion of various metals, particularly ferrous metals, which are in contact with the water. Such corrosion inhibitors, however, have exhibited certain disadvantages due in the main to the incorporation therein of the chromates and polyphosphates.

A major disadvantage of inhibitors containing chromates lies in the disposal of residual cooling water or "blow-down" which may contain toxic levels of chromate. In order to reduce the level of chromate to an acceptable concentration, it is usually necessary to either chemically reduce the hexavalent chromium to the more inocuous trivalent state or to reduce the hexavalent chromate level by ion exchange methods. Such additional manipulations add to the expense of operating an aqueous cooling or heating system and disposing of the system water. Another disadvantage found with inhibitors containing chromates is due to the fact that chromates are reduced in the presence of organic matter, sulphur dioxide, and the like, thereby causing a reduction in the concentration of chromate with a resulting increase in the amount of corrosion on metals in contact with such chromate inhibiting cooling water. The aforementioned reducing agents are extremely difficult to avoid since they can be picked up from the surrounding air or can be introduced to the system in the raw make up water.

The most serious disadvantage with polyphosphate based inhibitors is the promotion of the growth of algae and other micro-organisms caused by the nutrient value polyphosphates provide for algae and other micro-organisms. Such algae and micro-organism growth interferes with heat transfer, both from the cooling tower itself and from the process equipment in which the chilled water is recycled. Such growth requires additional maintenance and/or the inclusion in the cooling water of an additional ingredient to act as a biocide. In addition, polyphosphates undergo hydrolysis and revert to simple ortho phosphate ions, which promote the formation of phosphate sludges as a result of the interaction of the phosphate ions with calcium and magnesium ions in the water. To abate the tendency of the polyphosphates to hydrolyze to simple phosphates, considerable care is required in order to maintain pH of the wtaer in a relatively narrow range whereby the rate of polyphosphate hydrolysis is minimized but never really negated, since such hydrolysis is temperature as well as pH dependent. In addition, most water recirculated in cooling towers undergoes a several fold increase in the concentration of calcium and magnesium ions so that a limitation on the degree of reuse of the water is imposed because of the greater sludging tendency on a polyphosphate inhibitor. Accordingly, it is an object of this invention to provide a new and improved corrosion inhibiting composition.

Another object of this invention is to provide a new and improved corrosion inhibiting composition which is effective in preventing or retarding the corrosive effects of water on metals in contact therewith at water temperatures up to about 60° C.

Another object of this invention is to provide an organic based corrosion inhibiting composition which can be disposed of without causing a pollution problem, which effectively prevents the formation of sludges and deposits and which may be easily fed and controlled under conditions economically competitive with the chromate base or polyphosphate based corrosion inhibitors.

SUMMARY OF THE INVENTION

In accordance with this invention a novel chromate and phosphate free corrosion inhibiting composition has been discovered which comprises a lignosulfonate product, a water soluble salt of a polyvalent metal and at least one nitrogen containing thio compound.

The water soluble lignosulfonate product is derived from lignin as a by-product in the manufacture of sulfite pulp where wood is cooked with calcium disulfite-magnesium disulfite-sulphur dioxide liquor. In this process, lignin is converted to lignosulfonic acid which is thereafter converted to a solid product such as calcium lignosulfonate, potassium lignosulfonate or sodium lignosulfonate in the form of a hetero-dispersed polymer having an indeterminate organic structure. The lignosulfonate product also contains appreciable amounts of reducing sugars, which may be removed. As used herein, "pure" lignosulfonate indicates a product where the reducing sugars have been removed, or modified. "Crude" lignosulfonate product means such product wherein reducing sugars have not been removed or modified and which may contain reducing sugars varying from about 2% to about 20% or more by weight of the product, depending, for example, on the wood source of the pulp, the method employed in deriving the product, the chemical configuration of the product and degree of modification of the product. It is preferred in this invention to use crude lignosulfonate products since it has been discovered that at elevated temperatures from about 50° C. to about 60° C., the corrosion inhibiting composition of this invention which incorporates the crude lignosulfonate product provides greater corrosion inhibition than a composition made in accordance with this invention which incorporates a substantially pure lignosulfonate product. The proportions of reducing sugars present in the crude lignosulfonate product are not deemed critical. At ordinary ambient temperatures, (20–25° C.) there is substantially no difference in performance between compositions containing the crude lignosulfonate product and those containing pure lignosulfonate product.

The lignosulfonate product, whether crude or pure, is present in the composition of this invention at concentration levels ranging from about 50% to about 90% by weight of the composition. The preferred concentration of lignosulfonate product is about 89% by weight of the composition.

The polyvalent metals useful in this invention are zinc, nickel, cadmium, manganese, aluminum and cobalt. The polyvalent metals are used in this invention in the form of their water soluble salts and best results have been achieved using zinc sulfate monohydrate. The water soluble polyvalent metal salts are present in this invention at concentrations of about 5% to 20% and the preferred composition incorporates about 8% by weight of the composition of zinc sulfate monohydrate.

The third major component of the composition of the inhibiting composition of this invention is a nitrogen containing thio compound selected from the group consisting of dibutylthiourea (DBT), mercaptobenzothiozole (MBT) and mixtures thereof. The composition of this invention may incorporate mercaptobenzylthiozole alone, dibutylthiourea alone or a combination of the two. It has been discovered that best corrosion inhibition is achieved, particularly at temperatures in the range of 50° to 60° C., when the composition includes the dibutylthiourea and the mercaptobenzylthiozole in combination. The composition of this invention may incorporate from about 0.5% to about 10% by weight of the composition of either or both of the nitrogen containing thio compounds. The preferred composition of this invention incorporates about 1.5% by weight of the composition of dibutylthiourea and about 1.5% by weight of the composition of mercaptobenzylthiozole.

The composition of this invention can be readily prepared as a free flowing powder or, with the addition of a suitable binder such as dextrine, can be formed into shapes such as, for example, balls. It is preferred, in forming the corrosion inhibiting composition of this invention to first charge the lignosulfonate product into a suitable blender or mixer, followed successively by the addition of the water soluble polyvalent metal salt, and the sulphur and nitrogen containing organic compound. It should be pointed out, however, that the ingredients can be blended in any convenient manner and the order in which the ingredients are charged into the blender or mixer is not critical to the formation of the corrosion inhibiting composition of this invention.

In using the composition of this invention to inhibit the corrosive effects of water on metals, particularly ferrous metals, the inhibitor may be added directly to the water in the form of a solid, as for example, a free flowing powder or a preformed shape. Preferably the solid is added at a point where the water is flowing in order to aid in solubilizing the inhibitor. At times, however, it may be desirable to first form an aqueous slurry of the corrosion inhibitor, which slurry can be then added to the water.

In treating water to inhibit its corrosive properties according to this invention, the corrosion inhibiting composition is used in the water in concentrations ranging from about 50 parts per million to about 500 p.p.m., it having been determined that above about 500 p.p.m. problems may be encountered solubilizing the inhibitor. A preferred method of treating water in accordance with this invention consists of first treating a water system with the corrosion inhibitor at a feed rate of about 300 p.p.m. for an initial period of time, on the order of 3 to 5 days and then reducing the feed rate of the inhibitor to about 100 p.p.m. thereafter. This method provides an economical means of achieving effective corrosion inhibition since the highest corrosion rate of a metal will occur during the initial contact period between the metal and the water. The rate of corrosion falls off after this initial period, presumably due to the formation of protective oxide coatings on the metal. Thus, after the initial contact period, a lower concentration of inhibitor is required to maintain effective corrosion inhibition within the system. In addition, it has been found that the corrosion inhibiting composition of this invention can be phased into water cooling systems, replacing conventional chromate and phosphate inhibitors, without any loss in protection against corrosion.

In testing the composition of this invention, a simulated tower water was prepared having the following composition calculated on a calcium carbonate basis:

| | P.p.m. |
|---|---|
| Sodium | 1015 |
| Calcium | 250 |
| Magnesium | 150 |
| Chloride | 427 |
| Sulfate | 986 |
| Bicarbonate | 5 |

Metal corrosion is reported as the amount of corrosion in mils per year (m.p.y.). Mils per year is calculated by dividing the product of the change in weight of a metal test sample $\times 365 \times 1,000$ by the product of the area in inches of the metal sample $\times$ the density of the metal $\times$ $2.54 \times$ number of days tested. An acceptable corrosion inhibitor should provide sufficient protection so that during any 24-hour period of contact between the inhibited water and mild steel the rate of corrosion of the mild steel is less than about 3 mils per year at ambient temperature.

Prior to testing, mild steel (SAE 1010) test pieces ($1'' \times 2'' \times \frac{1}{16}''$) were thoroughly cleaned with an inhibited hydrochloric acid containing antimony and tin chlorides, commonly known as Clark's solution. The following example illustrates the method of testing the corrosion inhibitor of this invention and further illustrates the improved corrosion inhibition properties obtained when using a corrosion inhibitor made in accordance with this invention.

Examples 1–5

Simulated cooling tower water, as described above, was placed in a series of suitable containers, equal quantities of water being placed in each container, and various materials, the compositions of which are set out in greater detail in Table I below, were introduced for testing the inhibition properties thereof. The various materials were maintained at a concentration level in each container of 300 p.p.m. Mild steel test specimens, prepared as described above, were completely immersed in the simulated cooling tower water of each container and the cooling tower water in each of the containers was continuously aerated. A test specimen was used for each day of testing. A day constituted a twenty-four hour period and the tests were conducted for three days at room temperature.

The lignosulfonate product used in the following examples was a crude lignosulfonate, containing on the order of 3% reducing sugar, obtained from the Marathon Chemical Company and identified as "Norlig 22C."

At the end of each day, a test sample was withdrawn from each of the containers, dried and weighed and the corrosive rate in mils per year was determined as described above.

The pH of each of the water samples was maintained between 7 and 7.7.

The composition, in percent by weight, of the various inhibitors tested and the corrosion rate, reported in mils per year, of the steel test specimens are set forth in Table I below.

TABLE I

| | Percent | | | | Days | | |
|---|---|---|---|---|---|---|---|
| | Lignosulfonate product | | | | 1 | 2 | 3 |
| Example | (crude) | ZnSO₄ | MBT | DBT | Corrosion rate (m.p.y.) | | |
| 1 | 100 | | | | 37.6 | 32.6 | |
| 2 | 92 | 8 | | | 13.2 | 20.7 | |
| 3 | 91 | 7.5 | 1.5 | | 1.1 | .62 | |
| 4 | 91 | 7.5 | | 1.5 | 1.0 | 2.1 | |
| 5 | 89.5 | 7.5 | 1.5 | 1.5 | 1.6 | 2.0 | |

From the foregoing table, it can be seen that the inhibitors used in Examples 3, 4, and 5 which are prepared in accordance with this invention, showed a substantial improvement in inhibition properties over Example 1, which used only lignosulfonate and Example 2 which used only lignosulfonate and zinc sulfate monohydrate.

The following example illustrates the effect of the pH of the treated water on the corrosion inhibition properties of the composition made in accordance with this invention.

Example 6

Five vessels containing equal amounts simulated cooling water as described above, were prepared and the water contained within each treated with 300 p.p.m. of the corrosion inhibiting composition of Example 5. The pH of the water each of the vessels was adjusted so that it ranged from a pH of 6 in sample 1 to a pH of 10 in sample 5. Mild steel test specimens were completely immersed in the continuously aerated simulated tower water in each of the vessels as in Examples 1–5. The water was maintained at ambient temperature. After three days in the cooling tower water, the test specimens were removed, dried and weighed and the corrosion rate calculated as mils per year. Results are set forth on Table II below:

TABLE II

| Sample | pH | Corrosion (m.p.y.) |
|---|---|---|
| 1 | 6.0 | 2.8 |
| 2 | 7.0 | 1.7 |
| 3 | 8.0 | 1.5 |
| 4 | 9.0 | 14.7 |
| 5 | 10.0 | 14.6 |

From the results set forth in the above table, it is shown that the inhibiting composition of this invention performs in an excellent manner through a substantially wide pH range, i.e., from about 6 to about 8, which range includes the vast majority of waters which would be treated with the corrosion inhibiting composition of this invention. It can also be seen that throughout the broad pH range, the composition of this invention is substantially equally effective.

The following examples demonstrate the improved performance of the corrosion inhibiting composition made in accordance with this invention when the lignosulfonate component of the composition is in the crude form, i.e., containing reducing sugars.

EXAMPLES 7–11

The four vessels containing equal amounts of the simulated cooling tower water as described above were treated with 300 p.p.m. of the corrosion inhibiting composition of this invention which comprised 89.5 weight percent lignosulfonate product, 7.5 weight percent zinc sulfate monohydrate, 1.5 weight percent mercaptobenzothiozole and 1.5 weight percent dibutylthiourea. In Examples 7 and 8, however, the lignosulfonate component of the inhibitor, identified as "Norlig 22C," was crude and contained reducing sugars. Examples 9 and 10 the lignosulfonate component of the inhibiting composition was a pure lignosulfonate product i.e., containing substantially no reducing sugars, obtaind from the Marathon Chemical Company and marketed under the tradename "Maracelle E." As a comparison, test samples were immersed in water which contained no inhibitor. Mild steel test specimens were immersed in each of the vessels and the water was continuously aerated during the test. Both types of inhibitors were tested at room temperature and at a temperature of between about 50° and 60° C. The pH of the water system was about 7.5. The results of the test are set forth in Table III below:

TABLE III

| Example | Lignosulfonate product | Water temperature | Corrosion rate (m.p.y) Day 1 | Day 2 | Day 3 |
|---|---|---|---|---|---|
| 7 | Crude | Ambient | 1.6 | 2.0 | |
| 8 | do | 50–60° C | 5.3 | 4.7 | |
| 9 | Pure | Ambient | 5.7 | 1.7 | |
| 10 | do | 50–60° C | 12.4 | 6.8 | 13.9 |
| 11 | None | 50–60° C | 63.0 | 107.0 | 125.0 |

From the foregoing Table III it can be seen that at ambient temperatures there is substantially no difference in performance between compositions containing pure lignosulfonate product and those containing the crude. However, at temperatures of 50 to 60° C., where conditions are considerably more severe, the composition made in accordance with this invention and containing the crude lignosulfonate product performs substantially better than the composition containing the pure lignosulfonate product. It should be pointed out, however, that the composition containing the pure lignosulfonate product does substantially abate corrosion as contrasted to the corrosion rate of metal in water containing no inhibitor or containing as an inhibitor the compositions of Example 1 or 2 even at temperatures of 50 to 60° C.

The corrosion inhibiting composition of this invention provides corrosion protection for metals and prevents fouling of cooling systems and the like by sludges and deposits. Additionally, the disposal of waters containing the composition of this invention presents no pollution problem. The composition of this invention can be easily fed and controlled and its use is economically competitive with chromate based or polyphosphate based corrosion inhibitors. The composition of this invention can be used over a substantially wide pH range, about 5.5 to about 8.5, without substantially effecting its corrosion inhibiting characteristics.

While the invention has been described in connection with specific embodiments thereof, it will be understood that it is capable of further modification, and this application is intended to cover any variations, uses or adaptations of the invention. It will, therefore, be recognized that the invention is not to be considered as limited to the precise embodiments shown and described but is to be interpreted as broadly as permitted by the appended claims.

I claim:
1. A chromate and phosphate-free composition for treatment water to inhibit the corrosive effect of said water on metals, said composition comprising about 50% to about 90% by weight of water soluble lignosulfonate, about 5% to about 20% by weight of a water soluble salt of a polyvalent metal selected from the group consisting of zinc, nickel, cadmium, manganese, aluminum and cobalt and about 0.5% to about 10% by weight of a nitrogen containing thio compound selected from the group consisting of mercaptobenzothiozole, dibutylthiourea and mixtures thereof.

2. The composition of claim 1 wherein said lignosulfonate contains reducing sugars.

3. The composition of claim 1 wherein said lignosulfonate is substantially free of reducing sugars.

4. The composition of claim 1 wherein said nitrogen containing thio compound is mercaptobenzothiozole.

5. The composition of claim 1 wherein said nitrogen containing thio compound is dibutylthiourea.

6. The composition of claim 1 wherein said nitrogen containing thio compound is a mixture of mercaptobenzothiozole and dibutylthiourea.

7. The composition of claim 1 wherein said water soluble polyvalent metal salt is zinc sulphate monohydrate.

tact with water which comprises adding to said water a chromate and phosphate free composition comprising, on the dry weight basis:

A water soluble lignosulfonate—about 50% to about 90%

A water soluble salt of a polyvalent metal selected from the group consisting of zinc, nickel, cadmium, manganese, aluminum and cobalt—about 5% to about 20%

A compound selected from the group consisting of mercaptobenzothiozole, dibutylthiourea and mixtures thereof—about 0.5% to about 10% the concentration level of said composition in said water being maintained at a level of between about 50 p.p.m. to about 500 p.p.m. and maintaining said water at a pH of between about 5.5 to about 8.5.

10. The method of claim 9 wherein said composition comprises on a dry weight basis:

is first added to said water at a concentration level of 500 p.p.m. and thereafter added at a concentration level of 100 p.p.m.

References Cited

UNITED STATES PATENTS

| | | | |
|---|---|---|---|
| 3,173,864 | 3/1965 | Freedman | 252—181 |
| 3,277,011 | 10/1966 | Chadwick et al. | 252—391 |
| 3,335,085 | 8/1967 | Hronas | 252—391 |
| 3,362,912 | 1/1968 | Chadwick et al. | 252—391 |
| 3,445,400 | 5/1969 | Everhart | 252—389 |

RICHARD D. LOVERING, Primary Examiner

I. GLUCK, Assistant Examiner

U.S. Cl. X.R.

21—2.7; 252—8.55E, 85, 181, 387, 391